United States Patent [19]
Gillespie

[11] Patent Number: 5,794,584
[45] Date of Patent: Aug. 18, 1998

[54] STRATIFIED COMBUSTION CHAMBER FOR A CROSS-SCAVENGED, TWO STROKE, INTERNAL COMBUSTION ENGINE

[75] Inventor: George Gillespie, Portadown Co. Armagh, Northern Ireland

[73] Assignee: Outboard Marine Corporation, Waukegan, Ill.

[21] Appl. No.: 628,844

[22] Filed: Apr. 5, 1996

[51] Int. Cl.[6] .................................................. F02B 19/16
[52] U.S. Cl. ............................................. 123/257; 123/275
[58] Field of Search ........................................ 123/257, 268, 123/269, 275, 276

[56] References Cited

U.S. PATENT DOCUMENTS

| Re. 18,429 | 4/1932 | Peterson | 123/257 |
|---|---|---|---|
| 718,933 | 1/1903 | Hurd | 123/504 |
| 1,150,084 | 8/1915 | Weiss | 123/255 |
| 2,091,894 | 8/1937 | Treiber | 123/257 |
| 2,658,487 | 11/1953 | Basabe | 123/257 |
| 2,868,181 | 1/1959 | Dolza | 123/257 |
| 2,893,360 | 7/1959 | Muller | 123/257 |
| 2,900,966 | 8/1959 | Brueder | 123/257 |
| 3,044,455 | 7/1962 | Papa et al. | 123/257 |
| 3,270,721 | 9/1966 | Hideg et al. | 123/269 |
| 4,359,027 | 11/1982 | Scharpf | 123/307 |
| 4,872,433 | 10/1989 | Paul et al. | 123/257 |
| 5,209,200 | 5/1993 | Ahern et al. | 123/257 |
| 5,237,972 | 8/1993 | Groff et al. | 123/257 |

Primary Examiner—Willis R. Wolfe
Attorney, Agent, or Firm—Jones, Day, Reavis & Pogue

[57] ABSTRACT

Disclosed herein is an internal combustion engine comprising a cylinder block, a cylinder, an exhaust port, an inlet port, and a cylinder head fixed to the cylinder block including a recess, a spark plug fixed in the cylinder head along an axis located in a plane bisecting the inlet port and the exhaust port and extending at an acute angle to the cylinder axis, a fuel injector fixed in the cylinder head between the cylinder axis and the inlet side and along an axis located in the bisecting plane and extending in parallel and offset relation to the cylinder axis in the direction from the inlet port to the exhaust port, and a piston moveably axially in the cylinder and comprising an outer surface extending in opposing relation to the cylinder head and including a deflector extending diametrically from and between the cylindrical wall in transverse relation to the plane bisecting the inlet port and the exhaust port and including a centrally located raised crown having therein an axially inwardly extending bowl, an exhaust side wall extending from and between the cylindrical wall and defining an axially inwardly extending exhaust pocket extending between the exhaust side wall and the cylindrical wall, and an inlet side wall extending from and between the cylindrical wall and in spaced relation to the exhaust side wall and defining an axially inwardly extending inlet pocket extending along the inlet side wall and the cylindrical wall.

14 Claims, 1 Drawing Sheet

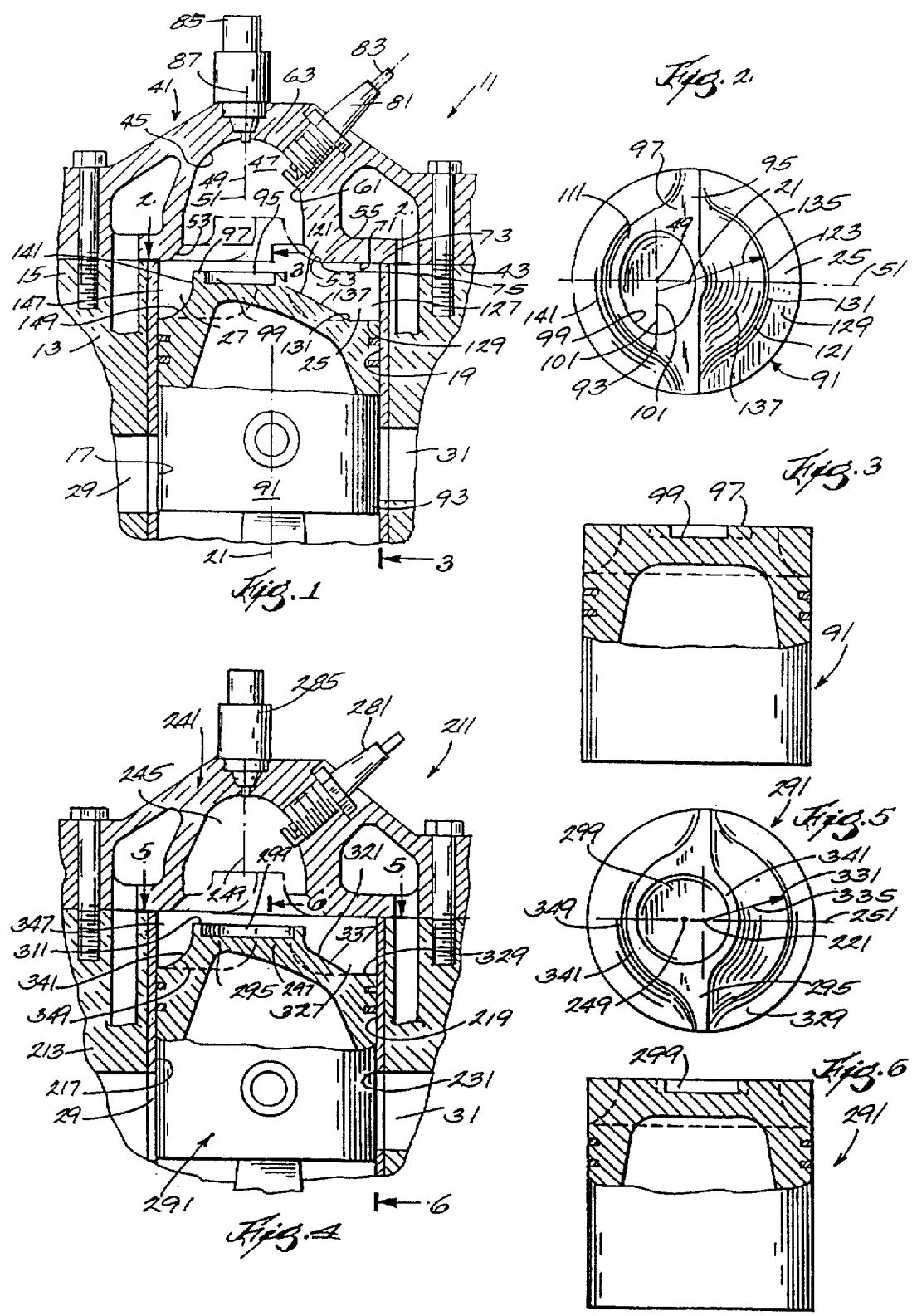

STRATIFIED COMBUSTION CHAMBER FOR A CROSS-SCAVENGED, TWO STROKE, INTERNAL COMBUSTION ENGINE

BACKGROUND OF THE INVENTION

The invention relates generally to two stroke internal combustion engines which are cross-scavenged. More particularly, the invention relates to such cross-scavenged engines which include stratified combustion chambers and which are directly fuel injected.

Attention is directed to the following U. S. Pat. Nos.

0,718,933, H. J. Hurd, issued Jan. 20, 1903

1,150,084, C. W. Weiss, issued Aug. 17, 1915

2,091,894, O. D. Treiber, issued Aug. 31, 1937

2,658,487, N. I. Basabe, issued Nov. 10, 1953

2,868,181, J. Dolza, issued Jan. 13, 1959

4,359,027, O. H. Scharpf, issued Nov. 16, 1982

4,872,433, Paul et al., issued Oct. 10, 1989

Re. 18,429, A. C. Peterson, issued Apr. 19, 1932

SUMMARY OF THE INVENTION

The invention provides an internal combustion engine comprising a cylinder block including an outer end, a cylinder extending from the outer end and including a cylindrical wall having an axis and opposite inlet and exhaust sides located in diametric relation to each other, an exhaust port located in the exhaust side of the cylindrical wall and in axially spaced relation from the outer end, and an inlet port located in the inlet side of the cylindrical wall and in axially spaced relation from the outer end, a cylinder head fixed to the outer end of the cylinder block and including a recess extending from the cylinder, a spark plug fixed in the cylinder head between the cylinder axis and the exhaust side of the cylinder and along an axis located in a plane bisecting the inlet port and the exhaust port and extending at an acute angle to the cylinder axis, a fuel injector fixed in the cylinder head between the cylinder axis and the inlet side of the cylinder and along an axis located in the plane bisecting the inlet port and the exhaust port and extending in parallel and offset relation to the cylinder axis in the direction from the inlet port to the exhaust port, and a piston moveable axially in the cylinder and comprising an outer surface extending in opposing relation to the cylinder head and including a deflector extending diametrically from and between the cylindrical wall in transverse relation to the plane bisecting the inlet port and the exhaust port and including a centrally located raised crown having therein an axially inwardly extending bowl, an exhaust side wall extending from and between the cylindrical wall and defining an axially inwardly extending exhaust pocket extending between the exhaust side wall and the cylindrical wall, and an inlet side wall extending from and between the cylindrical wall and in spaced relation to the exhaust side wall and defining an axially inwardly extending inlet pocket extending along the inlet side wall and the cylindrical wall.

The invention also provides an internal combustion engine comprising a cylinder block including an outer end, a cylinder extending from the outer end and including a cylindrical wall having an axis and opposite inlet and exhaust sides located in diametric relation to each other, an exhaust port located in the exhaust side of the cylindrical wall and in axially spaced relation from the outer end, and an inlet port located in the inlet side of the cylindrical wall and in axially spaced relation from the outer end, a cylinder head fixed to the outer end of the cylinder block and including a recess extending from the cylinder, a spark plug fixed in the cylinder head between the cylinder axis and the exhaust side of the cylinder and along an axis located in a plane bisecting the inlet port and the exhaust port and extending at an acute angle to the cylinder axis, a fuel injector fixed in the cylinder head between the cylinder axis and the inlet side of the cylinder and along an axis located in the plane bisecting the inlet port and the exhaust port and extending in parallel and offset relation to the cylinder axis in the direction from the inlet port to the exhaust port, and a piston moveable axially in the cylinder and comprising an outer surface extending in opposing relation to the cylinder head and including a deflector extending diametrically from and between the cylindrical wall in transverse relation to the plane bisecting the inlet port and the exhaust port and including a centrally located raised crown having therein an axially inwardly extending bowl which is oval and which has a major axis extending transversely to the plane bisecting the exhaust port and the inlet port and a minor axis extending in the plane bisecting the exhaust port and the inlet port and intersecting the major axis at a point on the axis of the fuel injector, and a rim in surrounding relation to the bowl, an exhaust side wall which extends from and between the cylindrical wall and from the rim to the cylindrical wall, and which includes a central portion extending at a generally constant first radius from the cylinder axis, and which defines an axially inwardly extending exhaust pocket extending between the exhaust side wall and the cylindrical wall and including a generally flat surface which extends generally transversely to the cylinder axis and from the cylindrical wall to a margin extending at a generally constant radius from the cylinder axis, and an inclined surface extending between the rim and the margin, and an inlet side wall which extends from and between the cylindrical wall and in spaced relation to the exhaust side wall and from the rim to the cylindrical wall, which includes a central portion extending at a generally constant second radius greater than the first radius and from the cylinder axis, and which defines an axially inwardly extending inlet pocket extending along the inlet side wall and the cylindrical wall and including a surface which extends arcuately from the cylindrical wall to the rim.

The invention also provides an internal combustion engine comprising a cylinder block including an outer end, a cylinder extending from the outer end and including a cylindrical wall having an axis and opposite inlet and exhaust sides located in diametric relation to each other, an exhaust port located in the exhaust side of the cylindrical wall and in axially spaced relation from the outer end, and an inlet port located in the inlet side of the cylindrical wall and in axially spaced relation from the outer end, a cylinder head fixed to the outer end of the cylinder block and including a recess extending from the cylinder, a spark plug fixed in the cylinder head between the cylinder axis and the exhaust side of the cylinder and along an axis located in a plane bisecting the inlet port and the exhaust port and extending at an acute angle to the cylinder axis, a fuel injector fixed in the cylinder head between the cylinder axis and the inlet side of the cylinder and along an axis located in the plane bisecting the inlet port and the exhaust port and extending in parallel and offset relation to the cylinder axis in the direction from the inlet port to the exhaust port, and a piston moveable axially in the cylinder and comprising an outer surface extending in opposing relation to the cylinder head and including a deflector extending diametrically from and between the cylindrical wall in transverse relation to the plane bisecting the inlet port and the exhaust port and including a centrally located raised crown having therein an axially inwardly extending bowl which is circular and which has an axis coincident with the axis of the fuel injector, and a rim in surrounding relation to the bowl, an exhaust side wall which extends from and between the cylindrical wall and from the rim to the cylindrical wall, which includes a central portion extending at a generally constant first radius from the cylinder axis, and which defines an axially inwardly extending exhaust pocket extending between the exhaust side wall and the cylindrical wall and including a generally flat surface which extends generally transversely to the cylinder axis and from the cylindrical wall to a margin extending at a generally constant radius from the cylinder axis, and an inclined surface extending between the rim and the margin, and an inlet side wall which extends from and between the cylindrical wall and in spaced relation to the exhaust side wall and from the rim to the cylindrical wall, which includes a central portion which extends at a generally constant second radius greater than the first radius and from the cylinder axis, and which defines an axially inwardly extending inlet pocket extending along the inlet side wall and the cylindrical wall and including a surface which extends arcuately from the cylindrical wall to the rim.

Other features and advantages of the invention will become apparent to those skilled in the art upon review of the following detailed description, claims and drawings.

DESCRIPTION OF THE DRAWINGS

FIG. 1 is a fragmentary sectional view of an internal combustion engine incorporating various of the features of the invention.

FIG. 2 is a top plan view, taken along line 2—2 of FIG. 1, of the piston included in the engine shown in FIG. 1.

FIG. 3 is a partially broken away sectional view taken along line 3—3 of FIG. 1.

FIG. 4 is a fragmentary sectional view of a second embodiment of an internal combustion engine incorporating various of the features of the invention.

FIG. 5 is a top plan view, taken along line 5—5 of FIG. 4, of the piston included in the engine shown in FIG. 4.

FIG. 6 is a partially broken away sectional view taken along line 6—6 of FIG. 4.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIGS. 1 through 3 is an internal combustion engine 11 comprising a cylinder block 13 including an outer end 15, and a cylinder 17 extending from the outer end 15 and including a cylindrical wall 19 having an axis 21 an inlet or transfer side 27 and an exhaust or scavenge side 25, located in opposed diametric relation to each other. The cylindrical wall 19 also includes an exhaust or scavenge port 31 located in the exhaust side 25 of the cylindrical wall 19 and in axially spaced relation from the outer end 15, and an inlet or transfer port 29 located in the inlet side 27 of the cylindrical wall 19 and in axially spaced relation from the outer end 15.

The internal combustion engine 11 also includes a cylinder head 41 including a cylinder block mating surface 43 fixed to the outer end 15 of the cylinder block 13 and a combustion chamber recess 45 which extends from the cylinder block mounting surface 43 and which, in part, defines a combustion chamber 47. The recess 41 extends along an axis 49 which is located in a plane 51 bisecting the inlet and exhaust ports 29 and 31, respectively, and which is offset from the cylinder axis 21 in the direction toward the inlet side 27 of the cylinder 17.

The recess 45 includes a conical portion 53 which is located adjacent the cylinder block 13, which extends about the recess axis 49, and which diverges outwardly toward the cylinder block 13. The conical portion 53 has an end or diameter 55, which is adjacent the cylinder block 13, which is less than the diameter of the cylinder 17, and which is located in offset relation to the cylinder axis 21.

The recess 45 also includes a cylindrical portion 61 which extends from the conical portion 53 and which is coaxial with the conical portion 53. In addition, the recess 45 includes a crown or dome portion 63 which extends from the cylindrical portion 61 and can take any suitable form.

Accordingly, the cylinder block mating surface 43 includes an eccentric ring portion 71 which is exposed to the cylinder 17 and which has an outer diameter or perimeter 73 coinciding with the cylindrical wall 19 and an inner diameter or perimeter 75 which coincides with the outer diameter or end 55 of the conical portion 53 of the recess 45. The inner and outer diameters or perimeters 73 and 75 are tangent to each other adjacent the point of intersection of the cylindrical wall 19 with the plane 51 bisecting the inlet and exhaust ports 29 and 31, respectively.

The cylinder head 41 also has fixed therein and includes a spark plug 81 which extends into the dome portion 63 of the cylinder head recess 45 and which is located between the cylinder axis 21 and the exhaust side 25 of the cylinder 17. The spark plug 81 extends along an axis 83 located in the plane 51 bisecting the inlet port 29 and the exhaust port 31 and extending at an acute angle to the cylinder axis 21. While other constructions can be employed, in the disclosed construction, the acute angle is approximately 45 degrees.

Also fixed in the cylinder head 41 is a fuel injector 85 located between the cylinder axis 21 and the inlet side 27 of the cylinder 17 and along the axis 49 of the recess 45.

The internal combustion engine 11 also includes a piston 91 which is moveable axially in the cylinder 17 and which, in cooperation with the cylinder wall 19 and the cylinder head recess 45, defines the variable volume combustion chamber 47. The piston 91 comprises an outer surface 93 extending in opposing relation to the cylinder head recess 45 and including a deflector or wall 95 extending diametrically from and between adjacent the cylindrical wall 19 in transverse relation to the plane 51 bisecting the inlet port 29 and the exhaust port 31. The deflector or wall 95 includes a centrally located raised crown 97 having a rim 111 which is generally oval in shape. As shown in FIG. 2, the crown 97 of the deflector 95 is located almost entirely in the inlet half side of the piston.

In addition, the deflector or wall 95 includes an exhaust side wall 121 which extends from and between adjacent the cylindrical wall 19 and from the rim 111 to adjacent the cylindrical wall 19 and which includes a central portion 123.

The exhaust side wall 121 also defines an axially inwardly extending exhaust side pocket 127 extending between the exhaust side wall 121 and the cylindrical wall 19 and including a generally flat surface 129 which extends generally transversely to the cylinder axis 21 and from the cylindrical wall 19 to a margin or perimeter 131 extending at a generally constant radius 135 from the cylinder axis 21. The exhaust side pocket 127 also includes an inclined and arcuate surface 137 extending between the rim 111 and the margin 131.

The deflector or wall 95 also includes an inlet side wall 141 which extends from and between adjacent the cylindrical wall 19 and in spaced relation to the exhaust side wall 121 and from the 111 rim to adjacent the cylindrical wall 19. The inlet side wall 141 also defines an axially inwardly extending inlet side pocket 147 extending along the inlet side wall 141 and the cylindrical wall 19 and including a surface 149 which extends arcuately from the cylindrical wall 19 to the rim 111.

As thus far disclosed, the construction of the piston 91 is conventional.

The crown 97 includes therein an axially inwardly extending bowl 99 which is located inwardly of the rim 111, which is oval in shape, and which has a major axis 101 extending transversely to the plane 51 bisecting the inlet port 29 and the exhaust port 31, and a minor axis extending in the plane 51 bisecting the inlet port 29 and the exhaust port 31 and intersecting the major axis 101 at a point on the axis 49 of the recess 45 and the fuel injector 85. The bowl 99, as shown in FIG. 2, is located essentially entirely in the inlet half side of the piston 91.

Shown in FIGS. 4 through 6 is a second and preferred embodiment of an internal combustion engine 211 which includes a cylinder block 213, a cylinder head 241, a spark plug 281, and a fuel injector 285 as already explained in connection with the engine 11 illustrated in FIGS. 1 through 3.

As in the engine 11, the engine 211 also includes a piston 291 which is moveable axially in the cylinder 217 and which comprises an outer surface 293 extending in opposing relation to the cylinder head recess 245 and which includes a deflector or wall 295 extending diametrically from and between adjacent the cylindrical wall 219 in transverse relation to the plane 251 bisecting the inlet port 229 and the exhaust port 231 and including a centrally located raised crown 297. As distinguished from the piston 91 included in the engine 11, the raised crown 297 of the deflector 295 includes, as shown in FIG. 5, a portion located in the exhaust half side of the piston 291. More specifically, the raised crown 297 includes an axially inwardly extending bowl 299 which is circular, which has an axis coincident with the axis 249 of the recess 245 and the fuel injector 285, and which extends into the exhaust half side of the piston 291. The distance between the axis 221 of the piston 291 and the axis 249 of the fuel injector 285 is less in the construction shown in FIG. 5 than in the construction shown in FIG. 2. Thus, a substantially greater portion of the bowl 299 is located directly underneath the fuel injector 285.

In addition, the deflector or wall 295 includes an annular rim 311 which is part of the crown 297 and which extends in surrounding relation to the bowl 299.

Still further in addition, the deflector or wall 295 includes an exhaust side wall 321 which extends from and between adjacent the cylindrical wall 219 and from the rim 311 to adjacent the cylindrical wall 219. The exhaust side wall 321 defines an axially inwardly extending exhaust side pocket 327 extending between the exhaust side wall 321 and the cylindrical wall 219. The exhaust side pocket 327 includes a generally flat surface 329 which extends generally transversely to the cylinder axis 221 and from the cylindrical wall 219 to a margin 331 extending at a generally constant radius 335 from the cylinder axis 221. In addition, the exhaust side pocket 327 includes an inclined and arcuate surface 337 extending between the rim 311 and the margin 331.

The deflector or side wall 295 also includes an inlet side wall 341 which extends from and between adjacent the cylindrical wall 219 and in spaced relation to the exhaust side wall 321 and from the rim 311 to adjacent the cylindrical wall 219. The inlet side wall 341 also defines an axially inwardly extending inlet side pocket 347 extending along the inlet side wall 341 and the cylindrical wall 219 and including a surface 349 which extends arcuately from the cylindrical wall 219 to the rim 311.

Various of the features of the invention are set forth in the following claims.

I claim:

1. An internal combustion engine comprising a cylinder block including an outer end, a cylinder extending from said outer end and including a cylindrical wall having an axis and opposite inlet and exhaust sides located in diametric relation to each other, an exhaust port located in said exhaust side of said cylindrical wall and in axially spaced relation from said outer end, and an inlet port located in said inlet side of said cylindrical wall and in axially spaced relation from said outer end, a cylinder head fixed to said outer end of said cylinder block and including a recess extending from said cylinder, a spark plug fixed in said cylinder head between said cylinder axis and said exhaust side of said cylinder and along an axis located in a plane bisecting said inlet port and said exhaust port and extending at an acute angle to said cylinder axis, a fuel injector fixed in said cylinder head between said cylinder axis and said inlet side of said cylinder and along an axis located in said plane bisecting said inlet port and said exhaust port and extending in parallel and offset relation to said cylinder axis in the direction from said inlet port to said exhaust port, and a piston moveable axially in said cylinder and comprising an outer surface extending in opposing relation to said cylinder head and including a deflector extending diametrically from and between said cylindrical wall in transverse relation to said plane bisecting said inlet port and said exhaust port and including a centrally located raised crown having therein an axially inwardly extending bowl, an exhaust side wall extending from and between said cylindrical wall and defining an axially inwardly extending exhaust pocket extending between said exhaust side wall and said cylindrical wall, and an inlet side wall extending from and between said cylindrical wall and in spaced relation to said exhaust side wall and defining an axially inwardly extending inlet pocket extending along said inlet side wall and said cylindrical wall.

2. An internal combustion engine in accordance with claim 1 wherein said bowl is circular and has an axis coincident with said axis of said fuel injector.

3. An internal combustion engine in accordance with claim 1 wherein said bowl is oval and has a major axis extending transversely to said plane bisecting said exhaust port and said inlet port and a minor axis extending in said plane bisecting said exhaust port and said inlet port and intersecting said major axis at a point on said axis of said fuel injector.

4. An internal combustion engine in accordance with claim 1 wherein said exhaust side wall includes a central portion which extends at a generally constant radius from said cylinder axis.

5. An internal combustion engine in accordance with claim 1 wherein said inlet side wall includes a central portion which extends at a generally constant radius from said cylinder axis.

6. An internal combustion engine in accordance with claim 1 wherein said exhaust pocket is defined by a surface which extends generally transversely to said cylinder axis and from said cylindrical wall to a margin extending at a generally constant radius from said cylinder axis, and an inclined surface extending between said crown and said margin.

7. An internal combustion engine in accordance with claim 1 wherein said inlet pocket is defined by a surface which extends arcuately from said cylindrical wall to said crown.

8. An internal combustion engine in accordance with claim 1 wherein said exhaust side wall includes a central portion which extends at a generally constant first radius from said cylinder axis, and wherein said inlet side wall includes a central portion which extends at a generally constant second radius greater than said first radius and from said cylinder axis.

9. An internal combustion engine in accordance with claim 1 wherein said acute angle is approximately 45 degrees.

10. An internal combustion engine in accordance with claim 1 wherein said crown includes a rim in surrounding relation to said bowl, and wherein said exhaust side wall and said inlet side wall extend to said rim.

11. An internal combustion engine comprising a cylinder block including an outer end, a cylinder extending from said outer end and including a cylindrical wall having an axis and opposite inlet and exhaust sides located in diametric relation to each other, an exhaust port located in said exhaust side of said cylindrical wall and in axially spaced relation from said outer end, and an inlet port located in said inlet side of said cylindrical wall and in axially spaced relation from said outer end, a cylinder head fixed to said outer end of said cylinder block and including a recess extending from said cylinder, a spark plug fixed in said cylinder head between said cylinder axis and said exhaust side of said cylinder and along an axis located in a plane bisecting said inlet port and said exhaust port and extending at an acute angle to said cylinder axis, a fuel injector fixed in said cylinder head between said cylinder axis and said inlet side of said cylinder and along an axis located in said plane bisecting said inlet port and said exhaust port and extending in parallel and offset relation to said cylinder axis in the direction from said inlet port to said exhaust port, and a piston moveable axially in said cylinder and comprising an outer surface extending in opposing relation to said cylinder head and including a deflector extending diametrically from and between said cylindrical wall in transverse relation to said plane bisecting said inlet port and said exhaust port and including a centrally located raised crown having therein an axially inwardly extending bowl which is oval and which has a major axis extending transversely to said plane bisecting said exhaust port and said inlet port and a minor axis extending in said plane bisecting said exhaust port and said inlet port and intersecting said major axis at a point on said axis of said fuel injector, and a rim in surrounding relation to said bowl, an exhaust side wall which extends from and between said cylindrical wall and from said rim to said cylindrical wall, and which includes a central portion extending at a generally constant first radius from said cylinder axis, and which defines an axially inwardly extending exhaust pocket extending between said exhaust side wall and said cylindrical wall and including a generally flat surface which extends generally transversely to said cylinder axis and from said cylindrical wall to a margin extending at a generally constant radius from said cylinder axis, and an inclined surface extending between said rim and said margin, and an inlet side wall which extends from and between said cylindrical wall and in spaced relation to said exhaust side wall and from said rim to said cylindrical wall, which includes a central portion extending at a generally constant second radius greater than said first radius and from said cylinder axis, and which defines an axially inwardly extending inlet pocket extending along said inlet side wall and said cylindrical wall and including a surface which extends arcuately from said cylindrical wall to said rim.

12. An internal combustion engine in accordance with claim 11 wherein said acute angle is approximately 45 degrees.

13. An internal combustion engine comprising a cylinder block including an outer end, a cylinder extending from said outer end and including a cylindrical wall having an axis and opposite inlet and exhaust sides located in diametric relation to each other, an exhaust port located in said exhaust side of said cylindrical wall and in axially spaced relation from said outer end, and an inlet port located in said inlet side of said cylindrical wall and in axially spaced relation from said outer end, a cylinder head fixed to said outer end of said cylinder block and including a recess extending from said cylinder, a spark plug fixed in said cylinder head between said cylinder axis and said exhaust side of said cylinder and along an axis located in a plane bisecting said inlet port and said exhaust port and extending at an acute angle to said cylinder axis, a fuel injector fixed in said cylinder head between said cylinder axis and said inlet side of said cylinder and along an axis located in said plane bisecting said inlet port and said exhaust port and extending in parallel and offset relation to said cylinder axis in the direction from said inlet port to said exhaust port, and a piston moveable axially in said cylinder and comprising an outer surface extending in opposing relation to said cylinder head and including a deflector extending diametrically from and between said cylindrical wall in transverse relation to said plane bisecting said inlet port and said exhaust port and including a centrally located raised crown having therein an axially inwardly extending bowl which is circular and which has an axis coincident with said axis of said fuel injector, and a rim in surrounding relation to said bowl, an exhaust side wall which extends from and between said cylindrical wall and from said rim to said cylindrical wall, which includes a central portion extending at a generally constant first radius from said cylinder axis, and which defines an axially inwardly extending exhaust pocket extending between said exhaust side wall and said cylindrical wall and including a generally flat surface which extends generally transversely to said cylinder axis and from said cylindrical wall to a margin extending at a generally constant radius from said cylinder axis, and an inclined surface extending between said rim and said margin, and an inlet side wall which extends from and between said cylindrical wall and in spaced relation to said exhaust side wall and from said rim to said cylindrical wall, which includes a central portion which extends at a generally constant second radius greater than said first radius and from said cylinder axis, and which defines an axially inwardly extending inlet pocket extending along said inlet side wall and said cylindrical wall and including a surface which extends arcuately from said cylindrical wall to said rim.

14. An internal combustion engine in accordance with claim 13 wherein said acute angle is approximately 45 degrees.

* * * * *